3,561,870
IMAGE MOTION DETECTION SYSTEM

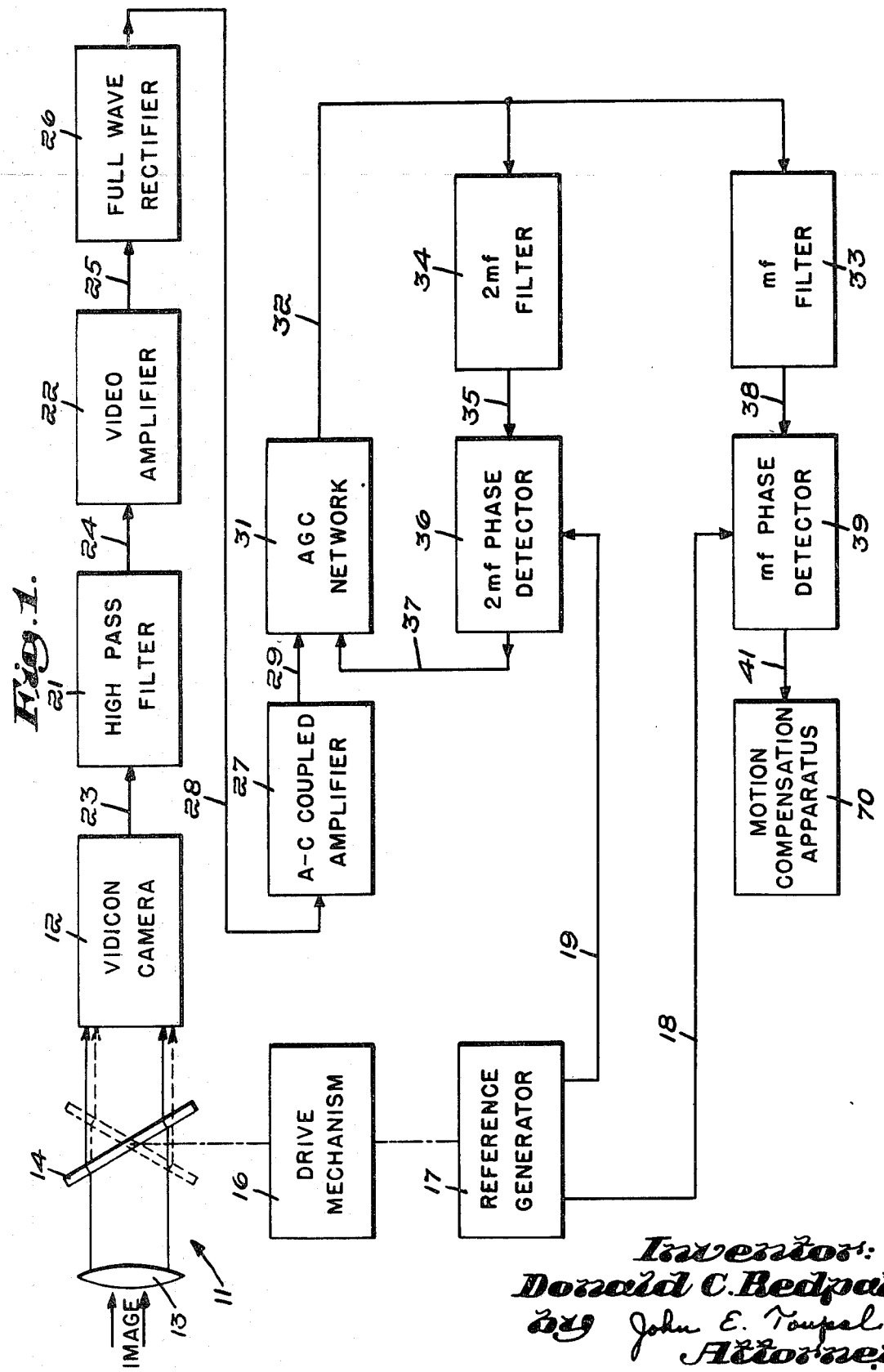

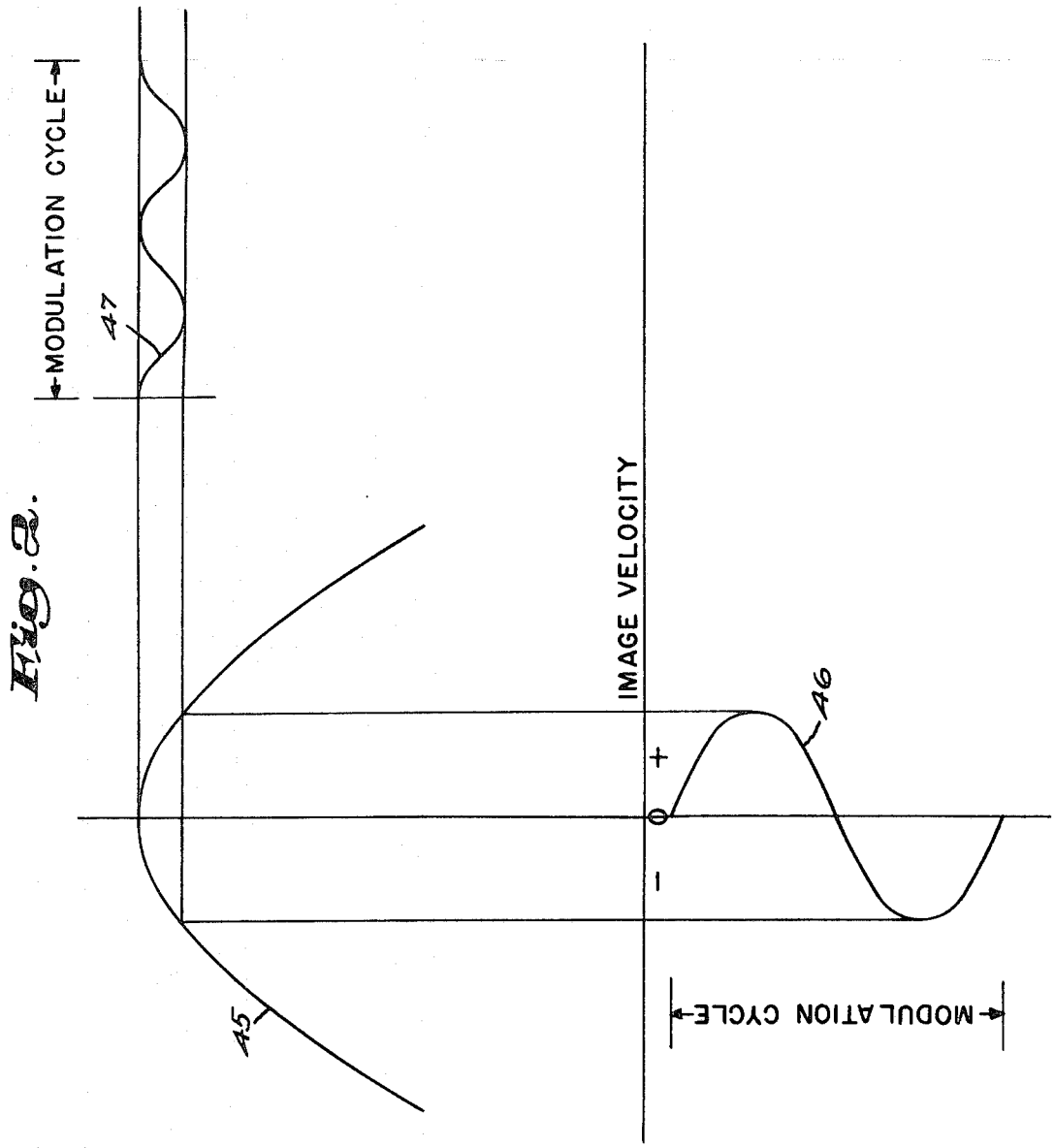

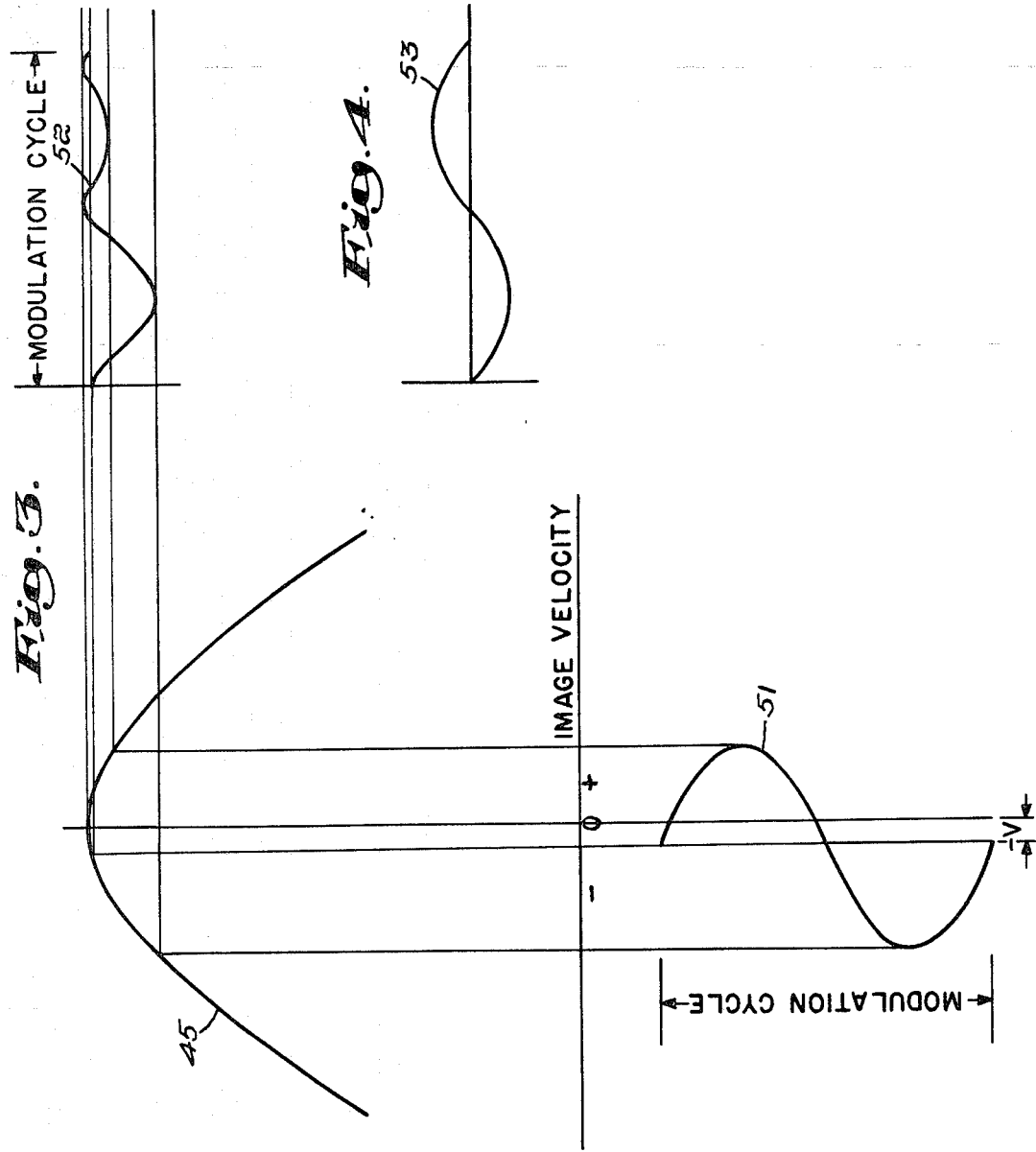

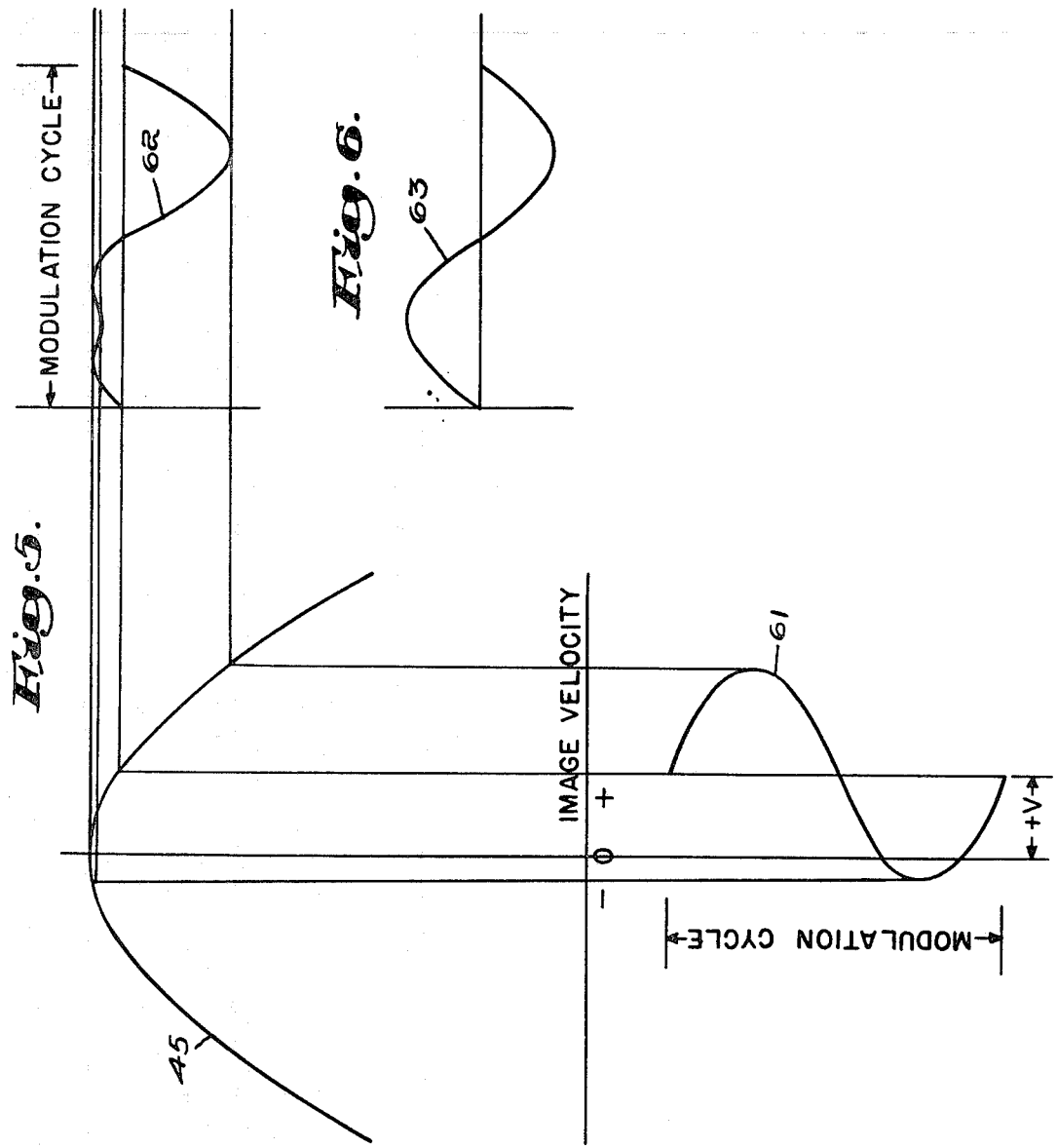

Donald C. Redpath, Winchester, Mass., assignor to Itek Corporation, Lexington, Mass., a corporation of Delaware
Filed Dec. 18, 1967, Ser. No. 691,472
Int. Cl. G01p 3/36
U.S. Cl. 356—28                            23 Claims

ABSTRACT OF THE DISCLOSURE

An image motion detection system in which an optical image of an observed object is velocity modulated at a given fundamental frequency on the target of a light integrating device such as that present in a vidicon camera. The high frequency video output of the vidicon camera is filtered at the fundamental frequency and compared to the modulation phase to produce an output representing both the magnitude and sense of relative movement existing between the observed object and the system.

---

This invention relates generally to a system for sensing the velocity of an optical image and, more particularly, relates to such a system for use with image motion compensation devices.

There exist various applications wherein one desires to detect or measure the degree of relative movement between objects. A well known application of this type is aerial photography wherein relative motion between an aircraft mounted camera and a photographed scene produces degradation in photographic image resolution quality. Various systems have been developed which attempt to compensate this relative image movement during film exposure so as to improve the quality of the resultant photograph. Most such systems generate an electrical potential proportional to the aircraft's velocity to altitude ratio (V/H) and utilize this potential to obtain image motion compensation. Typically, compensation is effected by rotating the aerial camera to maintain the camera's optical axis aligned with a fixed point on the object plane during film exposure or by maintaining a film movement rate such that optically aligned points on the film and object plane remain aligned during exposure. Examples of image motion compensation or IMC systems are disclosed in U.S. Pat. Nos. 2,967,470; 2,972,928; 3,158,079; and 3,163,098.

Although previous IMC systems have substantially improved the image resolution quality attainable by aerial photography, the ever increasing speed capability of newly developed air and spacecraft necessitates further improvement in compensation techniques. A fundamental requirement for improved image motion compensation is the accurate determination of the degree of relative motion existing between the aerial camera and the object plane being photographed.

The object of this invention, therefore, is to provide an image motion detection system which will reliably and accurately determine the relative velocity existing between a moving vehicle and a scene being photographed therefrom.

One feature of this invention is the provision of an image motion detection system including a light storage device which produces a video output signal indicative of the integrated intensity of image representing illumination received from an optical system. The optical system includes a modulator mechanism which generates movement of the optical image in a direction transverse to the optical axis of the system. The detection system's video output signal includes a detectable high frequency component indicative of any relative image motion existing in addition to that produced by the modulator mechanism.

Another feature of this invention is the provision of an image motion detection system of the above featured type wherein the light storage device is a vidicon sensor and the modulation mechanism produces transverse movement of the optical image on the face of the vidicon tube. The inherent light integrating characteristics of the vidicon camera render it particularly well suited for use in the system.

Another feature of this invention is the provision of an image motion detection system of the above featured types wherein the modulation mechanism produces image movement having a velocity component which varies periodically at a given fundamental freqeuncy. By introducing image velocity modulation at a uniform periodic rate, the high frequency video output signal will possess a fundamental modulation frequency component having an amplitude proportional to the magnitude of existing relative image motion.

Another feature of this invention is the provision of an image motion detection system of the above featured types including an image velocity measuring circuit including a high pass filter for attenuating a low frequency portion of the video output signal and a fundamental filter circuit tuned to the given modulation frequency. Low frequency attenuation of the video output signal produces the desired high frequency signal with the fundamental frequency component proportional to detected image velocity. Therefore, filtering of the high frequency signal at the velocity modulation frequency provides an output signal proportional to the detected image velocity.

Another feature of this invention is the provision of an image motion detection system of the above featured type wherein the measuring circuit includes a fundamental phase detector connected to the fundamental filter circuit and adapted to produce a first output signal when the fundamental filter output signal is in phase with image modulation and a distinguishable second signal when the fundamental filter output signal is out of phase with image modulation. The phase responsive distinguishable output signals of the fundamental phase detector represent the sense as well as the magnitude of detected image velocity.

Another feature of this invention is the provision of an image motion detection system of the above featured type wherein the fundamental phase detector produces a direct current voltage of one polarity when the fundamental filter output signal is in phase with image modulation and a direct current voltage of opposite polarity when the fundamental filter output signal is out of phase with image modulation. The direct current output voltages are particularly well suited for driving the servo systems conventionally used in image motion compensation systems.

Another feature of this invention is the provision of an image motion detection system of the above featured type wherein the measuring circuit includes a gain control circuit for regulating the amplitude of the high frequency output signal and responsive to a gain control signal derived from a harmonic filter tuned to a frequency twice that of the image modulation frequency. Since its amplitude is proportional to the video content of the optical image, the video output signal's second harmonic component can be used to normalize the output signal and render the system relatively independent of parameters, such as illumination and scene content.

Another feature of this invention is the provision of an image motion detection system of the above featured type wherein the modulation mechanism includes an optical element adapted to transmit the image representing light to the vidicon camera and mounted for movement relative to the optical axis of the system. By suitable driving the movable optical element, the desired periodic image velocity modulation on the vidicon camera's face is easily produced.

Another feature of this invention is the provision of an image motion detection system of the above featured type wherein the vidicon camera is adapted to produce scanning lines substantially parallel to the directions of image velocity modulation. By providing image velocity modulation parallel to the scanning lines on the vidicon camera, optimum velocity detection resolution is obtained.

These and other objects and features of the present invention will become more apparent upon a perusal of the following specification taken in conjunction with the accompanying drawings wherein:

FIG. 1 is a schematic block diagram of an image motion detection system encompassing a preferred embodiment of the invention;

FIG. 2 is a graph with curves representing image velocity and a corresponding signal waveform produced in the system shown in FIG. 1 with no steady component of image velocity.

FIG. 3 is a graph with curves representing image velocity and corresponding signal waveform with a steady component of image velocity in one direction;

FIG. 4 is a graph with a curve illustrating the fundamental frequency component of the signal waveform shown in FIG. 3;

FIG. 5 is a graph with curves representing image velocity and corresponding signal waveform with a steady component of image velocity in an opposite direction; and FIG. 6 is a graph with a curve illustrating the fundamental frequency component of the signal waveform shown in FIG. 5.

Referring now to FIG. 1 there is shown optical system 11 which transmits an optical image onto the face of the vidicon camera 12. The optical system 11 includes the optically aligned lens 13 and transparent plate 14 which is mounted for reciprocal movement about the pivot pin 15. Coupled with the optical plate 14 is the drive mechanism 16 which produces periodic reciprocating movement thereof between the positions illustrated by solid and dotted lines. The light beams representing the transmitted image are diffracted as shown by the surfaces of the optical plate 14 in each of the illustrative positions.

Because of the light diffraction and the reciprocating movement of the optical plate 14, it will be obvious that the position of the transmitted image on the face of the vidicon camera 12 is periodically shifted in the vertical direction. Preferably, the drive mechanism 16 reciprocally drives the optical plate 14 so as to produce on the face of the vidicon camera 12 a transverse image velocity which varies sinusoidally at a preselected uniform modulation frequency (mf.). Mechanically coupled to the drive mechanism 16 is the reference generator 17 which provides on reference signal line 18 an output voltage pulsating at the modulation frequency (mf.) and in phase with the image modulation. The reference generator 17 also provdes on the reference signal line 19 an output voltage pulsating at twice the modulation frequency (2 mf.).

Connected between the vidicon camera 12 and the video amplifier 22 by the signal lines 23 and 24 is the high pass filter circuit 21. The signal line 25 transmits the output of the video amplifier 22 into the full wave rectifier 26, the output of which is fed into the A-C coupled amplifier 27 on the signal line 28. Gain control of the amplifier output on signal line 29 is obtained in the automatic gain control network 31 producing a normalized output signal on the signal line 32. This signal is supplied to both the fundamental filter circuit 33 tuned to the modulation frequency mf. and to the harmonic filter circuit 34 tuned to twice the modulation frequency 2 mf. The harmonic filter output on signal line 35 is supplied to the harmonic phase detector 36 which also receives the 2 mf. reference signal on the signal line 19. The phase detected output on line 37 is used as a control signal for the automatic gain control network 31.

Received by the fundamental phase detector 39 are the fundamental filter 33 output signal on line 38 and the reference signal on line 18. The fundamental phase detector 39 produces on output signal line 41 a direct current voltage having a magnitude proportional to the amplitude of the filtered fundamental frequency component on signal line 38 and a polarity dependent upon the phase thereof with respect to the reference signal on line 18. For example, the voltage on output signal line 41 will be positive when the fundamental frequency component on line 38 is in phase with the reference signal on line 18 and negative when the fundamental component is out of phase with the reference signal.

The video signal developed on vidicon output line 23 has a power spectrum primarily determined by the image characteristics. If the image is stable and contains sharp detail, the video signal power spectrum contains high frequency components corresponding to that detail. Because of the inherent integration characteristics of the vidicon target, each picture element of the target presents a signal proportional to the time integral of the illumination impressed on that element since the last scan. Since the total illumination remains nearly constant, the integral of the video signal power spectrum for a moving image remains nearly constant but the high frequency content of the video signal decreases in accordance with loss in image definition resulting from image motion or smear. Therefore, rectified high frequency signals on the output line 28 are dependent upon any transverse velocity of the image observed by the vidicon camera 12. This dependence is illustrated by curve 45 in FIG. 2 which plots the rectified output voltage on signal line 28 verses transverse velocity of a given image on the face of the vidicon camera 12. As shown, the video output is maximum for zero image velocity and decreases uniformly with increasing image velocity in either of the assumed positive or negative directions. Although not so limited, the image velocity dependence of video output is most acute for velocity parallel to the scanning lines on the target of the vidicon camera 12.

A single cycle of the velocity modulation produced by the optical plate 14 is represented by curve 46 in FIG. 2. The modulation generates a modulation component in the video output on line 25. This modulation component is detected in the rectifier 26 producing on the signal line 28 a detected signal with the waveform represented by curve 47. It will be noted that the waveform 47 is sinusoidal with a frequency twice that of the velocity modulation frequency mf. Therefore, the signal 47 will be rejected by the fundamental filter 33 and phase detector 39 so that no DC output voltage will appear on signal line 41. Thus, the absence of an image velocity in addition to that produced by the optical system 11 is indicated by a zero output voltage on the signal line 41.

The curves in FIG. 3 illustrate the existence of a steady component of image velocity ($-V$) in the assumed negative direction. Curve 51 represents the steady component of velocity ($-V$) modulated by a single cycle of the velocity produced by the optical system 11. As diagrammatically illustrated, the image velocity represented by curve 51 produces a detected output on the signal line 28 with the complex waveform 52.

Curve 53 in FIG. 4 illustrates the fundamental frequency component of the waveform 52 shown in FIG. 3. The frequency of the fundamental component 53 is equal to the modulation frequency mf. and to the tuned frequency of the fundamental filter 33. Therefore, the fundamental frequency component signal 53 will be passed by the fundamental filter 33 and appear on the signal line 38. Being out of phase with the modulation cycle and accordingly with the reference signal on line 18, the fundamental component 53 will produce on output line 41 a negative voltage having a value proportional to its amplitude. Thus, the existence of a steady negative image velocity in addition to the modulation velocity introduced by the optical system 11 is indicated by a negative output voltage from the fundamental phase detector 39.

Finally, the curves in FIG. 5 illustrate a steady component of image velocity (+V) in the assumed positive direction. This steady component of image velocity (+V) as modulated by a single cycle of the velocity produced by the optical system 11 is represented by curve 61. As diagrammatically illustrated, the image velocity represented by curve 61 produces on the signal line 28 a detected output with the complex waveform 62.

Curve 63 in FIG. 6 represents the fundamental frequency component of the waveform 62 shown in FIG. 5. Again, the frequency of the fundamental component 63 is equal to the modulation frequency and the tuned frequency of the fundamental filter 33. Therefore, the fundamental component 63 is passed by the fundamental filter 33 and appears on the output lines 38. However, in this instance, the fundamental component 63 is in phase with the modulation cycle and with the reference signal on the signal line 18 so that a positive voltage will be produced by the fundamental phase detector 39 on the output line 41. The value of this positive voltage again is proportional to the amplitude of the fundamental frequency component appearing on the signal line 38.

Referring back to FIGS. 3 and 5, it will be noted that the assumed image velocity (+V) in the positive direction was substantially greater than the assumed image velocity (−V) in the negative direction. It also will be noted that the smaller negative velocity (−V) produced a fundamental frequency component 53 of smaller amplitude than did the fundamental frequency component 63 produced by the larger positive velocity (+V). Thus, the value of the direct current voltage on the output line 41, which is proportional to the amplitude of the fundamental component, is indicative of the magnitude of the detected steady image velocity. Furthermore, as described above, the polarity of the voltage indicates the sense of the detected velocity.

The above discussions and curves 45 in FIGS. 2, 3 and 5 were based on the dependence of high frequency video output on the velocity of a given image. However, normally the scene viewed by the vidicon camera 12 will be continually changing which will in turn produce corresponding changes in the video output. Therefore, in the absence of some form of automatic control, the value of the output voltage from the fundamental phase detector 39 for a given magnitude of image velocity will vary substantially for different observed scenes. The illustrated embodiment of the present invention alleviates this problem with the automatic gain control network 31 and associated harmonic filter 34 and phase detector 36. The amplitude of the second harmonic component of the rectified output signal produced on line 28 is proportional to the video content in the received image. Therefore, by detecting this component in the harmonic filter 34 and phase detector 36 and using it as a reference for the automatic gain control network 31, a normalized output is produced on signal line 32 which is relatively independent of parameters such as illumination and image content. The harmonic phase detector 36 provides a DC output proportional to the amplitude of the second harmonic output from the harmonic filter 34 before its use in the automatic gain control network 31.

The velocity indicating voltage developed on output line 41 is used as a control voltage in the motion compensation apparatus 70 which can comprise a variety of image motion compensation systems conventionally used in aerial photography. For example, the above noted U.S. patents disclose several IMC systems in which the present invention could be desirably utilized. Although the velocity sensor disclosed output. Therefore, in the absence of some form of automatic control, the value of the output voltage from the fundamental phase detector 39 for a given magnitude of image velocity will vary substantially for different observed scenes. The illustrated embodiment of the present invention alleviates this problem with the automatic gain control network 31 and associated harmonic filter 34 and phase detector 36. The amplitude of the second harmonic component of the rectified output signal produced on line 28 is proportional to the video content in the received image. Therefore, by detecting this component in the harmonic filter 34 and phase detector 36 and using it as a reference for the automatic gain control network 31, a normalized output is produced on signal line 32 which is relatively independent of parameters such as illumination and image content. The harmonic phase detector 36 provides a DC output proportional to the amplitude of the second harmonic output from the harmonic filter 34 before its use in the automatic gain control network 31.

The velocity indicating voltage developed on output line 41 is used as a control voltage in the motion compensation apparatus 70 which can comprise a variety of image motion compensation systems conventionally used in aerial photography. For example, the above noted U.S. patents disclose several IMC systems in which the present invention could be desirably utilized. Although the velocity sensor disclosed herein is uniquely suited for incorporation with IMC systems, it also can be desirably used in other types of applications entailing velocity measurement. For example only, by focusing the image of a vibrating mechanical element into the optical system 11, a measurement of vibration velocity could be obtained.

For reasons of simplicity, the illustrated embodiment and above description involves image velocity modulation in only the vertical direction. Such a system is useful in applications wherein the absolute direction of detected relative image motion is known. However, in some applications it is desirable to determine the exact direction of detected motion. Such a result can be obtained, for example, by producing output voltages representing both x and y components of detected velocity. For these applications periodic image velocity modulation can be provided on the vidicon target in two perpendicularly related directions. The bi-directional modulation could be provided by use in the optical system 11 of an additional plate (not shown) identical to the plate 14 but mounted for periodic movement on a vertical axis. Similar modulation could be produced by a single nutating lens (not shown) mounted obliquely to the axis of the optical system 11. However, as noted above, the detection resolution is optimum where the image modulation is parallel to the scanning lines on the vidicon target. Therefore, it would be desirable in the bi-directional modulation system to provide a vidicon scan pattern having, for example, alternating vertical and horizontal scan lines.

Obviously, many modifications and variations of the present invention are possible in light of the above teachings. It is, therefore, to be understood that within the scope of the appended claims the invention can be practiced otherwise than as specifically described.

What is claimed is:

1. An image motion detection system comprising a light storage device for receiving light representing a given optical image and for producing a video output signal indicative of the integrated intensity of said light, an optical system for transmitting said light to said light storage device, said optical system comprising modulation means for producing movement of said optical image in a direction transverse to the optical axis of said optical system, and motion measuring circuit means responsive to the high frequency component of said video output signal.

2. An image motion detection system according to claim 1 wherein said modulation means comprises periodic drive means for producing said optical image movement with a velocity component which varies periodically at a given fundamental frequency.

3. An image motion detection system according to claim 2 wherein said measuring circuit means comprises high pass filter means for attenuating the low frequency component of said video output signal so as to produce a high frequency output signal.

4. An image motion detection system according to claim 3 wherein said measuring circuit means comprises a detector means for detecting the modulation component in said high frequency output signal, and a fundamental filter means for filtering the detected output of said detector means and tuned to said given fundamental frequency.

5. An image motion detection system according to claim 4 wherein said measuring circuit means further comprises fundamental phase detection means connected to said fundamental filter means, said fundamental phase detection means producing a first output signal when the signal from said fundamental filter means is in phase with said velocity component and a distinguishable second output signal when the signal from said fundamental filter means is out of phase with said velocity component.

6. An image motion detection system according to claim 5 wherein said fundamental phase detection means comprises output means for producing a direct current signal having a magnitude proportional to the amplitude of the signal from said fundamental filter means and a polarity dependent on the phase thereof.

7. An image motion detection system according to claim 6 wherein said measuring circuit means further comprises a gain control means for controlling the amplitude of said detected output.

8. An image motion detection system according to claim 7 wherein the gain control signal for said gain control means is provided by a harmonic filter means tuned to a frequency twice that of said fundamental frequency and connected to receive said detected output.

9. An image motion detection system according to claim 1 wherein said modulation means comprises an optical element for transmitting said light and mounted for movement relative to the optical axis of said optical system, and a drive means for producing movement of said optical element.

10. An image motion detection system according to claim 1 wherein said light storage device comprises a vidicon tube and said modulation means produces said movement of said optical image on the face of said vidicon tube.

11. An image motion detection system according to claim 10 wherein said modulation means comprises a periodic drive means for producing said optical image movement on the face of said vidicon tube with a velocity component which varies periodically at a given fundamental frequency.

12. An image motion detection system according to claim 11 wherein said measuring circuit means comprises high pass filter means for attenuating the low frequency component of said video output signal so as to produce a high frequency output signal.

13. An image motion detection system according to claim 12 wherein said measuring circuit means comprises a detector means for detecting the modulation component in said high frequency output signal, and a fundamental filter means for filtering the detected output of said detector means and tuned to said given fundamental frequency.

14. An image motion detection system according to claim 13 wherein said measuring circuit means further comprises fundamental phase detection means connected to said fundamental filter means, said fundamental phase detection means producing a first output signal when the signal from said fundamental filter means is in phase with said velocity component and a distinguishable second output signal when the signal from said fundamental filter means is out of phase with said velocity component.

15. An image motion detection system according to claim 14 wherein said fundamental phase detection means comprises output means for producing a direct current signal having a magnitude proportional to the amplitude of the signal from said fundamental filter means and a polarity dependent on the phase thereof.

16. An image motion detection system according to claim 15 wherein said measuring circuit means further comprises a gain control means for controlling the amplitude of said detected output.

17. An image motion detection system according to claim 16 wherein the gain control signal for said gain control means is provided by a harmonic filter means tuned to a frequency twice that of said fundamental frequency and connected to receive said detected output.

18. An image motion detection system according to claim 11 wherein said modulation means comprises an optical element for transmitting said light and mounted for movement relative to the optical axis of said optical system, and a drive means for producing movement of said optical element.

19. An image motion detection system according to claim 11 wherein said vidicon tube comprises scan control means for producing scanning lines substantially parallel to the directions of image movement on the face of said vidicon tube.

20. An image motion detection system according to claim 19 wherein said modulation means comprises an optical element for transmitting said light and mounted for movement relative to the optical axis of said optical system, and a drive means for producing movement of said optical element.

21. A method for measuring the relative velocity of an object comprising the steps of; directing an optical image of the object toward the target of a light integrating device, producing periodic velocity modulation of the optical image on the target at a given fundamental frequency, attenuating the low frequency components of the video output of the light integrating device to produce a high frequency output signal, detecting the modulation component in said high frequency output signal, and filtering said detected modulation component at the given fundamental frequency.

22. A method according to claim 21 including the step of comparing the phase of the fundamental frequency filtered signal to the phase of the periodic velocity modulation and producing a first output signal when the fundamental frequency filtered signal is in phase with the velocity modulation and a distinguishable second output signal when the fundamental frequency filtered signal is out of phase with the velocity modulation.

23. A method according to claim 22 including the step of gain controlling the high frequency output signal with a gain control signal produced by filtering said detected modulation component at a frequency of twice the given fundamental frequency.

References Cited

UNITED STATES PATENTS

| | | | |
|---|---|---|---|
| 2,333,768 | 11/1943 | Davies | 95—12.5UX |
| 2,561,197 | 7/1951 | Goldsmith | 178—6.8 |
| 2,798,115 | 7/1957 | Weins | 95—12.5UX |
| 2,866,373 | 12/1958 | Doyle | 356—28 |
| 3,336,585 | 8/1967 | Macovski | 340—258 |
| 3,340,481 | 9/1967 | Kyte | 250—203X |

RICHARD A. FARLEY, Primary Examiner

J. G. BAXTER, Assistant Examiner

U.S. Cl. X.R.

95—12.5; 178—6.8